March 11, 1969 E. A. BODKIN ET AL 3,432,425
UPGRADING OF NAPHTHA
Filed May 4, 1966 Sheet 6 of 8
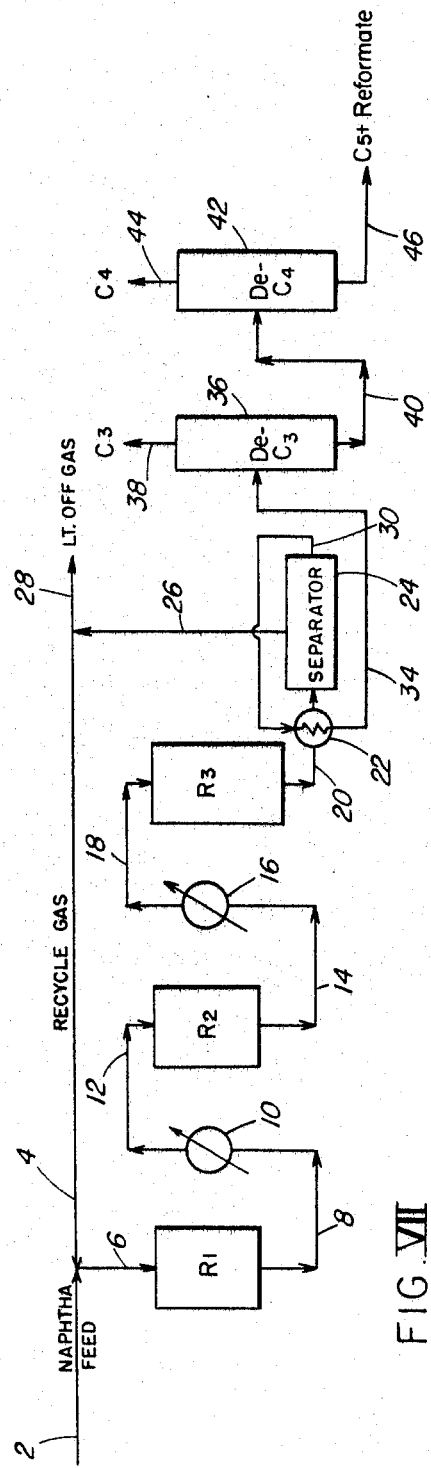
FIG. VI
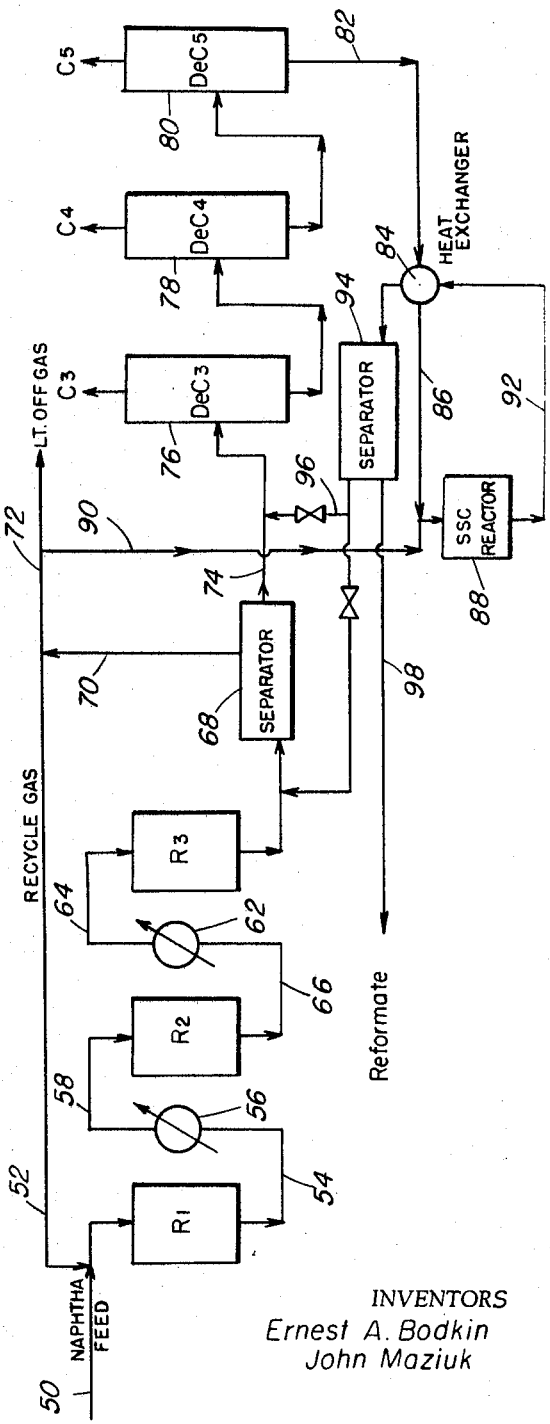
FIG. VII
INVENTORS
Ernest A. Bodkin
John Maziuk

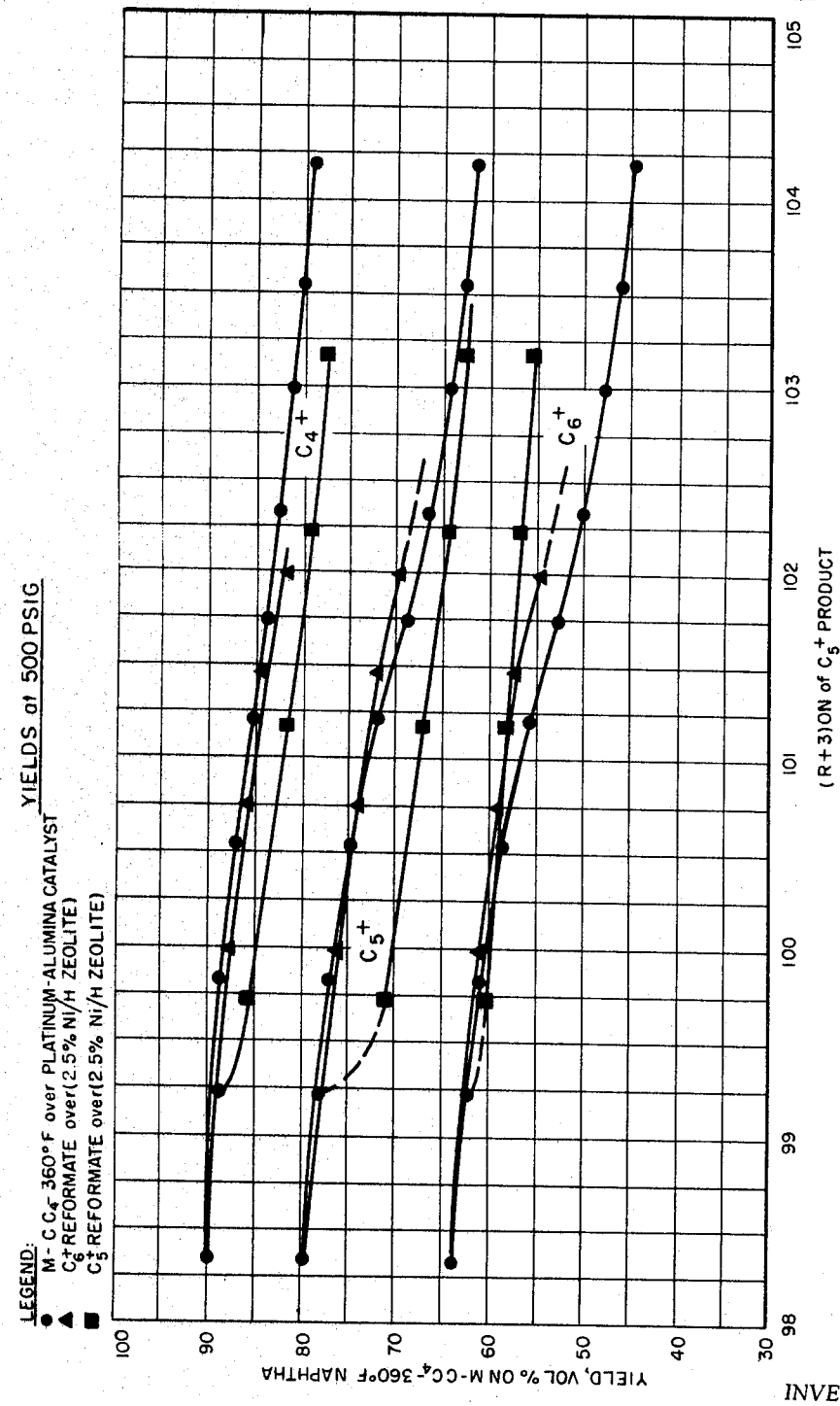

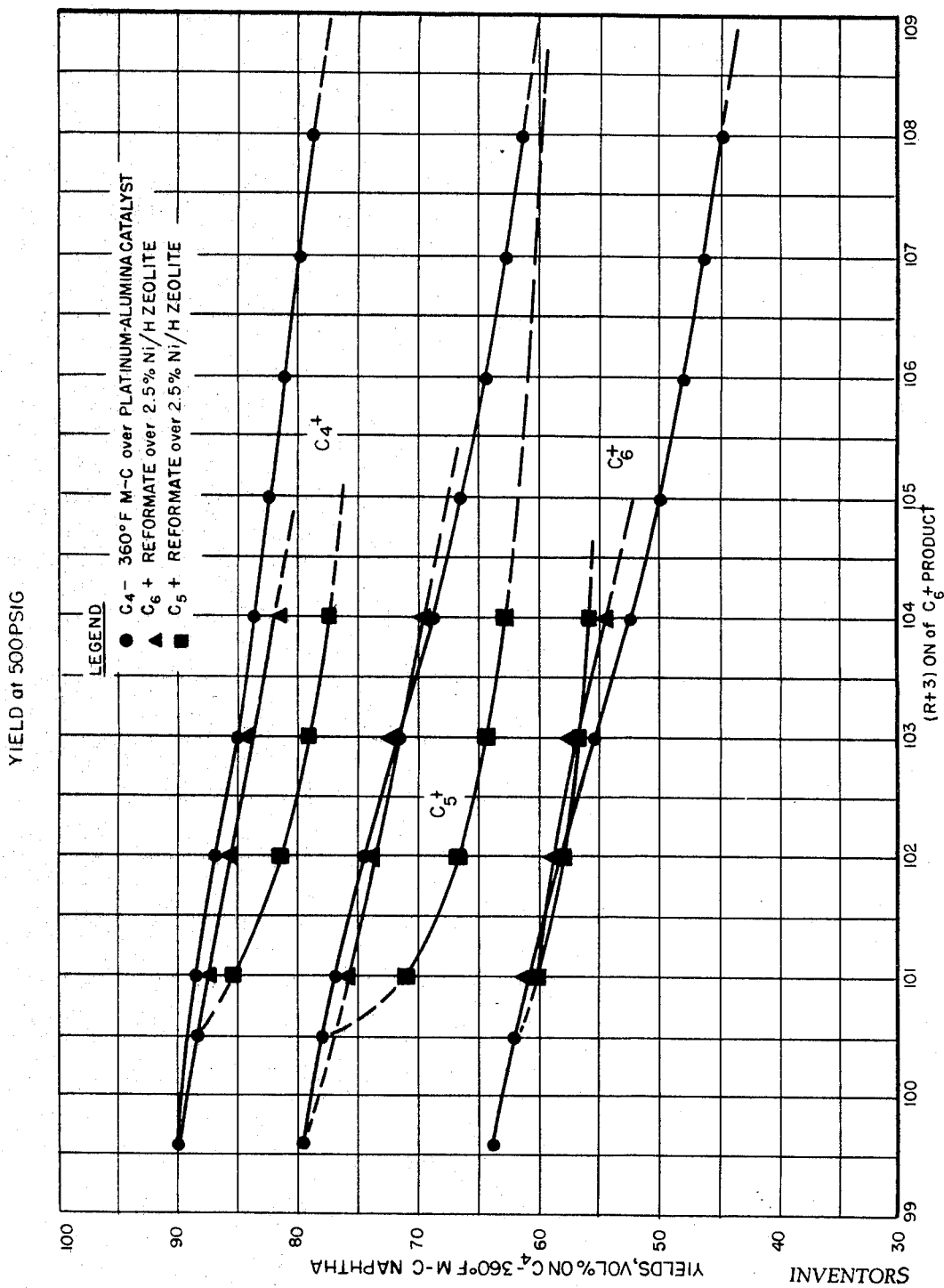

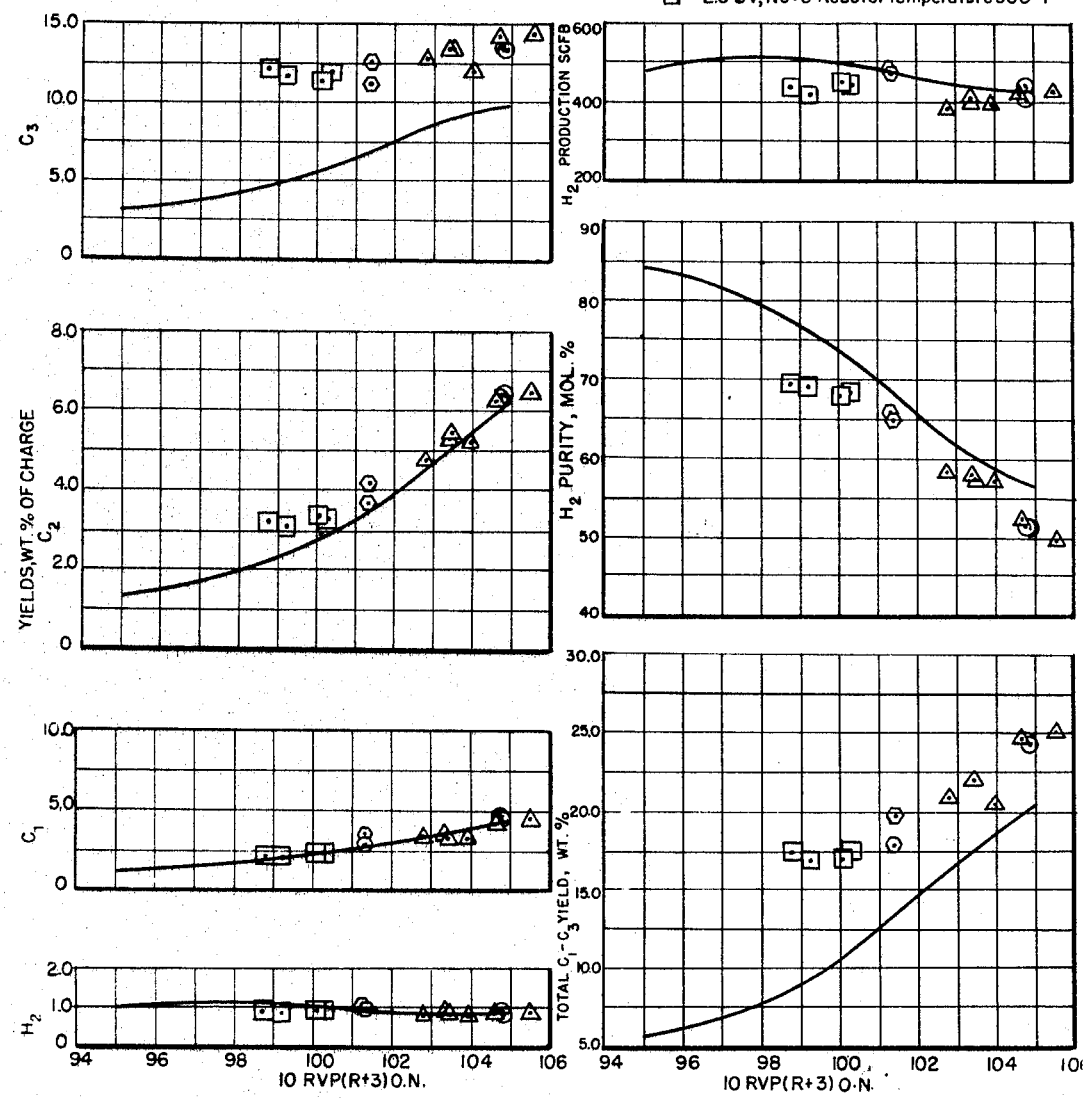

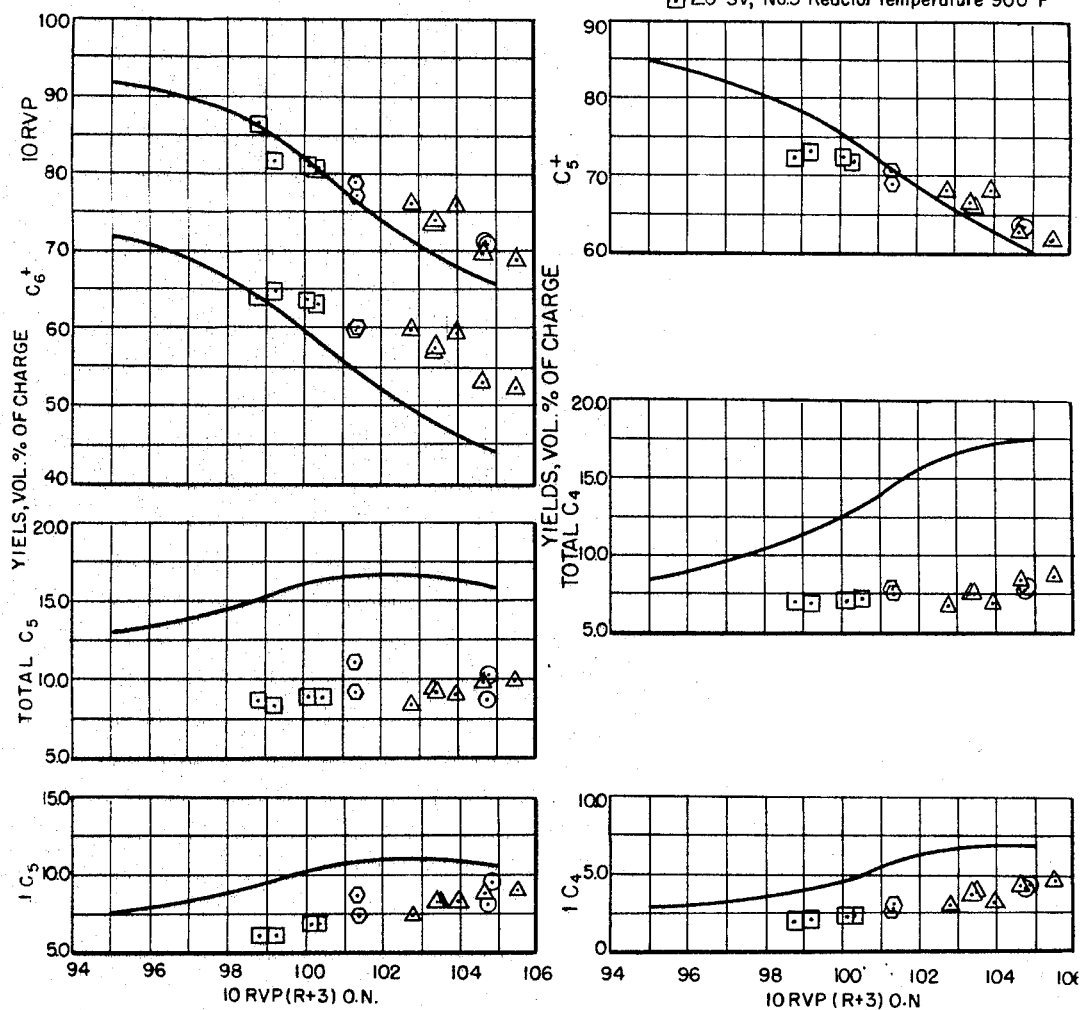

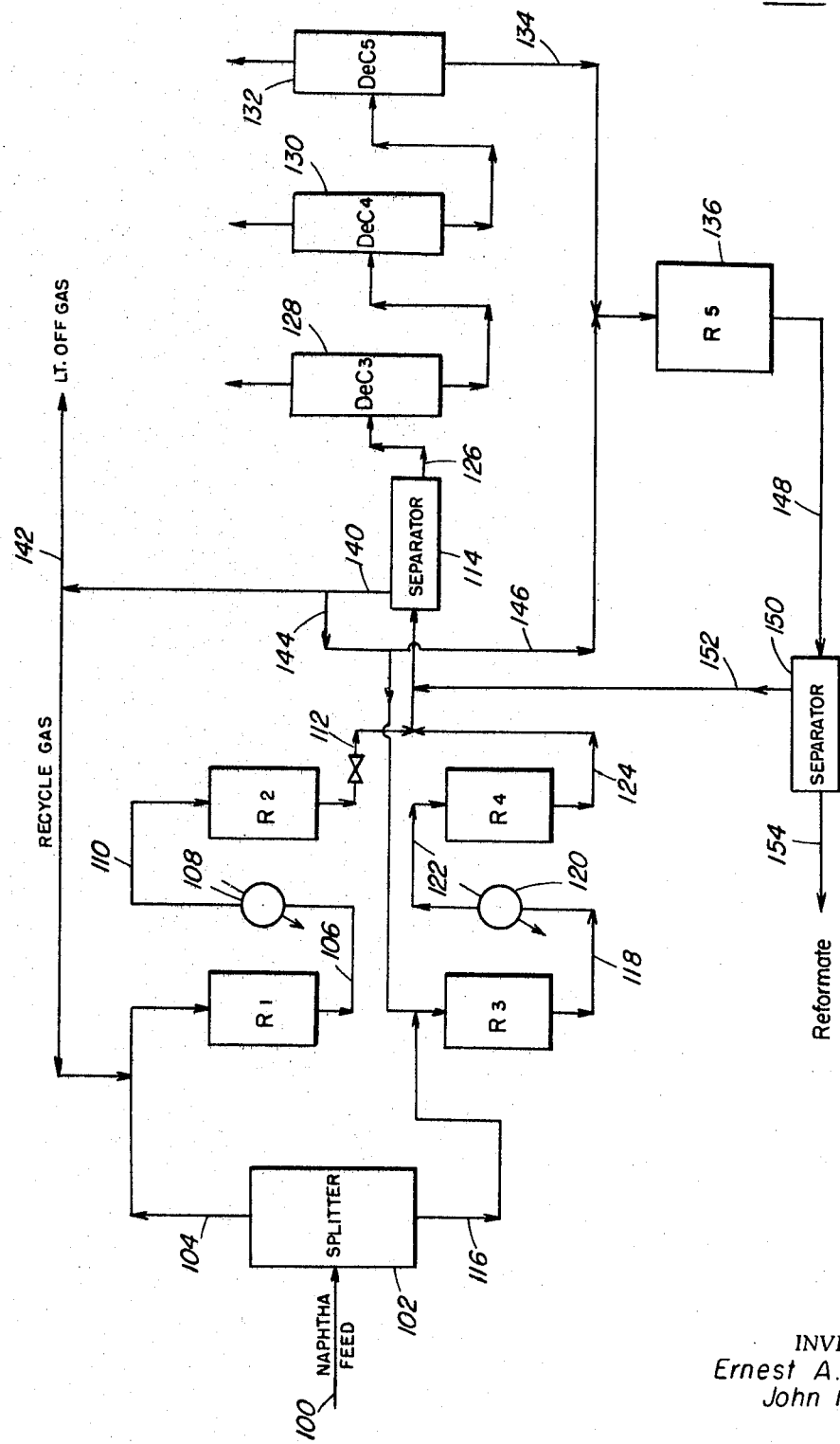

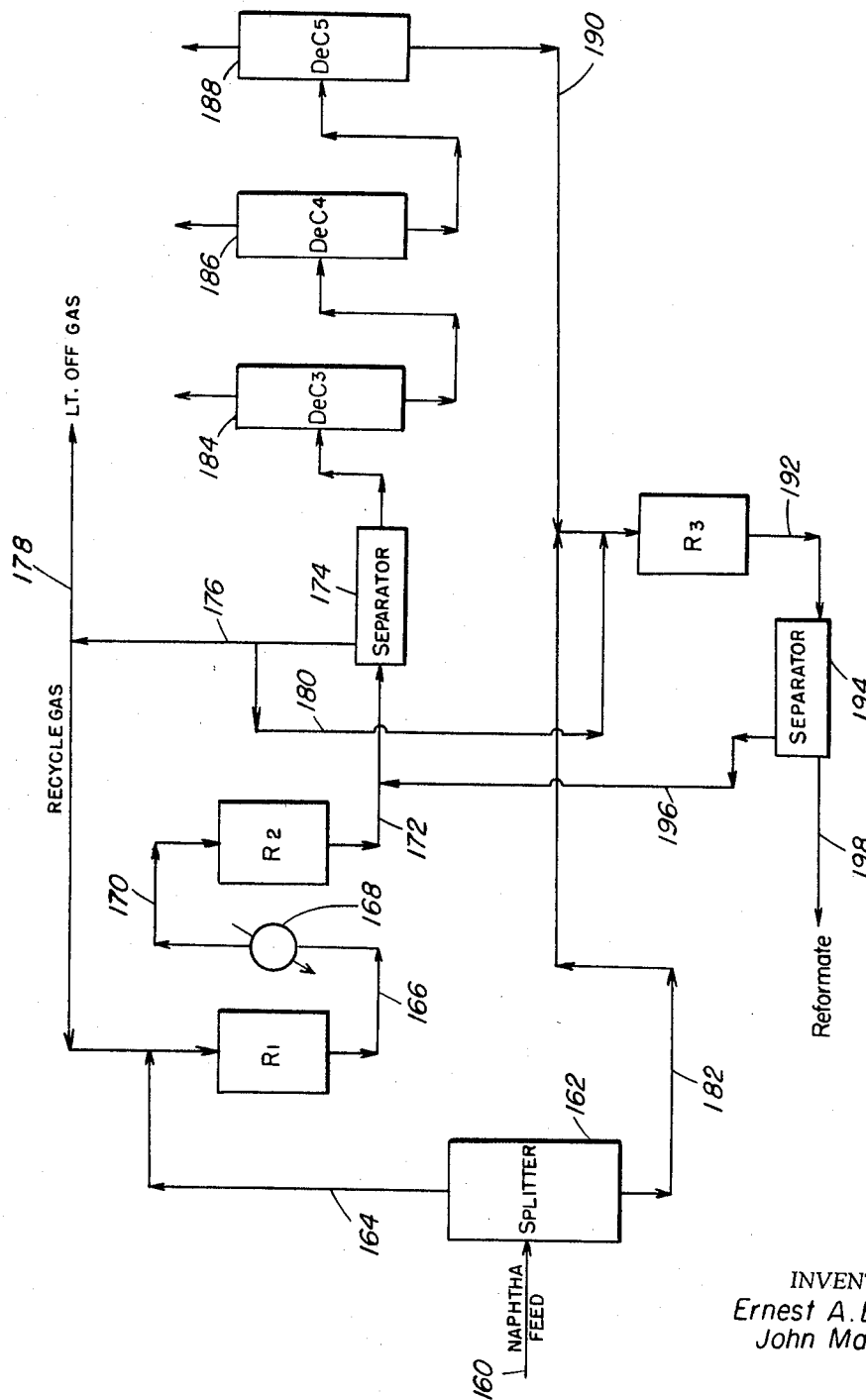
FIG. IX
INVENTORS
Ernest A. Bodkin
John Maziuk

United States Patent Office 3,432,425
Patented Mar. 11, 1969

3,432,425
UPGRADING OF NAPHTHA
Ernest A. Bodkin, Wenonah, and John Maziuk, Woodbury, N.J., assignors to Mobil Oil Corporation, a corporation of New York
Filed May 4, 1966, Ser. No. 547,667
U.S. Cl. 208—80                               5 Claims
Int. Cl. C10g 35/06, 23/02

ABSTRACT OF THE DISCLOSURE

A combination of processing steps is identified for upgrading $C_5+$ naphtha boiling hydrocarbon materials in a combination of reforming steps arranged to effect more selective and desired dehydrogenation of naphthenes, hydrocyclization of paraffins and isomerization of hydrocarbons to branched and ring compounds in conjunction with the selective removal by a dual function catalyst of low octane normal paraffins without significantly reducing the amount of high octane producing components of the naphtha charge.

---

Figure 1:
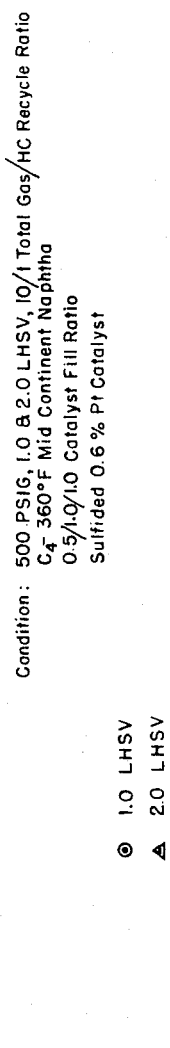

This invention relates to a method for upgrading naphtha boiling range hydrocarbons. In a more particular aspect, the present invention relates to the method and combination of process steps for upgrading $C_5+$ naphtha boiling hydrocarbons to gasoline boiling products of improved octane rating.

The octane number of a gasoline depends generally on the character and content of various hydrocarbon components. During the reforming of gasoline boiling hydrocarbons, a plurality of reactions are effected which include isomerization, aromatization, dehydrogenation, cyclization, and even limited cracking to yield gasoline product having an increased content of aromatics and branched hydrocarbons. Thus, in reforming operations, particularly desirable reactions are those involving dehydrogenation of naphthenic hydrocarbons to aromatics, cyclization of straight-chain hydrocarbons to aromatics, and the isomerization of hydrocarbons to produce relatively highly branched hydrocarbons.

An object of the present invention is to improve the octane rating of gasoline boiling range hydrocarbons.

A further object of the present invention is to provide an improved method for upgrading naphthas boiling in the gasoline range.

A still further object of this invention is to provide an improved combination of process steps for processing $C_5+$ naphthas into gasoline boiling range products of relatively high octane rating.

Other objects and advantages of this invention will become more apparent from the following discussion.

The present invention relates to a method for processing a mixture of hydrocarbons comprising $C_5$ and higher boiling hydrocarbons boiling in the naphtha boiling range to gasoline boiling range products of a desired octane rating by a combination of processing steps which includes reforming $C_5+$ naphtha boiling hydrocarbon materials under conditions to dehydrogenate naphthenes, dehydrocyclize paraffins and isomerize paraffinic hydrocarbons. Thereafter the resulting reformate product is passed in contact with a catalyst selective for converting n-paraffins in preference to cyclic and branched hydrocarbons under conditions to form products comprising saturated normally gaseous products. The processing steps performed in accordance with this invention significantly increase the higher octane contributing components of a reformed naphtha by effecting conversion of less desired relatively low octane constituents by the selective conversion thereof to more desired products including saturated gaseous products. Accordingly, the present invention relates to the selective conversion of low octane hydrocarbon constituents contained in a reformate product to more useful products without substantially affecting the relatively high octane branch chained and ring compounds components of the reformate product.

In one embodiment of this invention, it is contemplated reforming a mixture of gasoline boiling range hydrocarbons under conditions to yield a reformate product comprising a mixture of hydrocarbons including normal paraffins of at least $C_6$ carbon atoms and thereafter subjecting the reformate product to contact with a selective upgrading catalyst having at least selective conversion characteristics of isomerizations and dehydrocyclization activity for the preferential conversion of straight chain or normal paraffins to higher octane product material in the substantial absence of cracking branch chained and ring component.

In a further embodiment of the present invention, a $C_5+$ naphtha fraction is separated under conditions to remove $C_5$ hydrocarbons from higher boiling naphtha hydrocarbons, the higher boiling hydrocarbons containing $C_6$ hydrocarbons are reformed under conditions to maximize dehydrogenation, dehydrocyclization and isomerization of $C_6$ and higher boiling hydrocarbons constituents and thereafter straight chain paraffinic constituents remaining in the reformate product are converted with the catalyst hereindescribed having selective cracking characteristics at substantially reforming conditions in the presence of hydrogen to produce LPG gaseous product material and provide a separable reformate product having an octane number substantially above about 90.

It is contemplated in yet another embodiment of this invention of employing the selective upgrading catalyst with hydrogenating activity in a reactor downstream of a normal multiple reactor reforming arrangement as a bed of catalyst in a separate reaction zone or the selective upgrading catalyst may be a part of the catalyst fill employed in the last reactor of a platinum type catalyst reforming system. That is, in a reforming arrangement of at least three reactors the last reactor may be filled with a minor or major portion of the selective conversion catalyst hereindescribed and it may occupy up to about 100% of the total catalyst fill in the last reactor. On the other hand, in this or other reforming arrangements operating, for example, with a swing reactor system, it may be preferable to maintain the selective catalyst for upgrading the reformate product in one or more separate reaction zones. In an arrangement of the latter type, the selective conversion catalyst may be maintained as a fixed bed of catalyst or a fluid bed of the selective conversion catalyst may be maintained in a separate reaction zone.

The reforming process with which this invention is successfully employed is generally carried out in a plurality of interconnected and sequentially arranged reaction zones under conditons selected to promote dehydrogenation, dehydrocyclization and isomerization of at least $C_5+$ hydrocarbons to higher octane products. Suitable reforming conditions include reforming temperatures in the range of from about 800° F. to about 1000° F. and more usually temperatures of at least 850° F. The reforming pressure employed may be as high as about 1000 p.s.i.g., however, it is preferred to employ lower operating pressures for economic reasons and of the order of about 500 p.s.i.g. or lower. Pressures as low as about 100 p.s.i.g. may be employed to advantage in some operations. Liquid hourly space velocities of the reactants may also be varied over a relatively wide range of from about 0.1 up to about 10 but usually not substantially greater than about 4. In general, it is preferred to maintain an excess of hydrogen in combination with the naphtha being reformed so that the mole ratio of hydrogen to hydrocarbon charge employed may be in the range of from about 1 and about 20 preferably from about 4 to about 12.

The catalyst employed in the reforming steps may be selected from a number of the known reforming catalyst of the prior art which include for example, a catalyst comprising alumina in the eta or gamma form or mixtures thereof in combination with a noble metal. Platinum series metals such as platinum, palladium, osmium, iridium, ruthenium, or rhodium deposited on a suitable support comprising alumina is preferred. Generally, the alumina comprises a major portion of the catalyst and may comprise 95% by weight or more of the catalyst. It is contemplated, however, combining other components with the alumina such as the oxides of silica, magnesium, zirconium, thorium, vanadium, titanium, boron or mixtures thereof. In another embodiment the platinum-alumina complex either with or without one or more of the above components such as silica etc. may also be promoted with small amounts of halogen such as chlorine or fluorine in amounts ranging from about 0.1% up to about 3% by weight. However, in a preferred embodiment the reforming catalyst carrier material is preferably a high surfaced area material, primarily eta alumina material of at least 200 and preferably 300 or more square meters per gram. This alumina carrier material is impregnated with a platinum type hydrogenating component described above in amounts ranging up to about 1% by weight but generally, not substantially over about 0.6% by weight. This catalyst may also be promoted with one or more of the other catalyst components above described and known in the art.

It is to be understood that a naturally occurring or synthetically prepared alumina with or without silica may be employed as a carrier material or support for the platinum type hydrogenating component. Preferably, the platinum-alumina catalyst employed comprises a high surface area material such as an eta base alumina discussed above. Before use, the catalyst is reduced in a hydrogen atmosphere under conditions to maintain the catalyst in a relatively dry moisture free atmosphere before being put on-stream since it has been found that at a given moisture and certain related temperature level that a relationship exists which decreases the surface area and has a simultaneous deactivating effect on the catalyst. Accordingly, it is preferred to employ in the reforming step of this invention, relatively dry reforming conditions and this is particularly true when employing relatively low pressure reforming conditions.

The hydrocarbon feed or naphtha charge to be processed by the method of this invention comprises a mixture of hydrocarbons including for example, a petroleum distillate boiling in the range of from about $C_5$ hydrocarbons up to about 450° F. end point which boiling range includes naphthas in a light and heavy gasoline boiling range and some kerosine boiling material. Generally, however, the hydrocarbon feed may have an end point in the range of from about 180 up to about 400° F. A typical feed employed for the production of benzene rich fractions may boil in the range of from about $C_5$ hydrocarbons up to about 250° F.

The reformate produced in the method of this invention is a complex mixture of hydrocarbons including normal paraffins, branched chained hydrocarbons and cyclic hydrocarbons preferably aromatic hydrocarbons. The reformate produced in accordance with this invention is thereafter passed in contact with a catalyst regarded as a dual purpose catalyst more fully described herein to effect a selective cracking or hydrogenolysis of straight-chain paraffins under conditions directed to effect at least partial conversion of n-paraffins to more suitable lower boiling saturated hydrocarbon without substantially reducing the concentration of isoparaffins and cyclic hydrocarbons in the reformate product. Accordingly, in a preferred aspect of this invention the entire reformate product and particularly straight-chain hydrocarbons of at least about five carbon atoms are passed in contact with a catalyst comprising a crystalline alumino-silicate cracking component of a restricted pore size no greater than about 5 Angstroms promoted with a hydrogenating component. The catalyst employed is selective for cracking of straight-chain or n-paraffins to the substantial exclusion of cracking of branched and cyclic hydrocarbons.

Accordingly, by the method and catalyst of this invention, catalytic reformates of from about 95 to about 102 (R+3) octane number rating on a $C_5+$ basis are hydrogenatively upgraded by selective cracking at reforming pressures by contact with a dual purpose crystalline alumino-silicate containing catalyst having a pore diameter in the range of from about 4 to about 6 A. and preferably not above about 5 A. In operations employing the dual purpose catalyst hereindescribed, it appears reasonable to suggest, based on the product distribution obtained, that the straight-chain components of the catalytic reformate are in part, selectively cracked to saturated normally gaseous product and in part isomerized and dehydrocyclized to components of much higher octane ratings. As a result, the yields of $C_5+$, $C_6+$ and 10 RVP final liquid products are unexpectedly and significantly increased compared to that in the normal reformate product before such treatment.

By employing the catalysts hereindescribed in combination to form the method and process of this invention, the cracking of the straight-chain components is predominately to saturated $C_2$ to $C_4$ hydrocarbons. The value of such products as LPG and as feeds in petrochemical process makes these product materials a valuable asset to the process hereindescribed.

It has also been found, depending upon the particular conditons employed, that the addition of nitrogen and/or sulfur compounds in one or more of the steps of the combination hereindescribed is beneficial in providing significant improvements in yields, quality of the final liquid products and an extension of catalyst life while maintaining the operation at an optimum performance level.

The following examples are presented to illustrate the improvement obtained by the method and process of this invention.

EXAMPLE 1

Catalyst A comprising a calcium alumino-silicate promoted with platinum was prepared from a sodium alumino-silicate by incorporating 0.3% by weight of platinum and exchange out with $Ca^{++}$ ion substantially all of the original $Na^+$ ion. A blend of $C_6$ hydrocarbons to simulate in composition a $C_6+$ catalytic reformate fraction of 98–100 (R+3) octane member from reforming a $C_6$–250° F. Kuwait naphtha was combined with 150 p.p.m. of nitrogen and passed in contact with catalyst A above-described. Table 1 below presents the results of these tests.

TABLE 1

| | Charge Stock | Run No., MUP 7-3 | Average of 8 (1-5) |
|---|---|---|---|
| Operating Conditions: | | | |
| Temperature, °F | | 800 | 950 |
| Pressure, p.s.i.g | | 200 | 400 |
| LHSV | | 2.0 | 1.0 |
| Added $H_2$/FF Mole Ratio | | 5.7 | 16.1 |
| Catalyst Age, Mins | | 192 | 362 |
| Product (R+3) Octane Numbers: | | | |
| $C_5$+ Liquid Product | 100.0 | 101.9 | 104.8 |
| $C_6$+ Liquid Product | 100.0 | 101.9 | 104.9 |
| Product Yields, percent on Charge: | | | |
| $C_5$+ Product, Vol. percent | 100.0 | 98.2 | 86.8 |
| $C_6$+ Product, Vol. percent | 100.0 | 98.2 | 86.7 |
| Total $C_5$-Product, Wt. percent | 0.0 | 1.0 | 8.6 |
| Net $H_2$ Production, s.c.f./B | | 39 | 190 |
| Performance Criteria: | | | |
| $nC_6$, Unconverted, Mol percent Charge | 23.1 | 20.6 | 12.4 |
| $nC_6$, to $C_5$+C, Mol percent Charge | | 1.0 | 8.7 |
| $nC_6$, to $C_6H_6$, Mol percent Charge | | 1.3 | 1.5 |
| $C_6$ Iso-Ps, Unconverted, Mol percent Charge | 26.6 | 25.5 | 20.1 |
| $C_6$ Iso-Ps to $C_5$+C, Mol percent Charge | | 0.0 | 0.1 |
| $C_6$ Iso-Ps to $C_6H_6$, Mol percent Charge | | 1.3 | 6.4 |
| $C_6H_6$, In Product, Mol percent Charge | 50.3 | 52.7 | 58.2 |
| Net $C_6H_6$ Make, Mol percent Charge | 0.0 | 2.4 | 7.9 |
| $C_5$-to: ($C_1$+$C_2$+$C_3$), Mol percent Charge | 0.0 | >0.1 | 1.7 |
| $C_5$-to: ($C_4$+$C_5$), Mol percent Charge | 0.0 | 0.0 | >0.2 |

It will be observed from an evaluation of the data that under the conditions employed, selective cracking with catalyst A upgrades the $C_6$ feed by about 5 (R+3) octane numbers. Furthermore, it is noted that the improvement in quality of the $C_6$+ products is accompanied by an average net production of hydrogen. The data of Table 1 also shows that a high percentage of the normal $C_6$ in the fresh $C_6$ feed is converted to lighter than $C_6$ paraffins and also a portion of the component is aromatized to benzene. Furthermore, it is noted that a portion of the isoparaffins in the $C_6$ feed are also cyclized to benzene. This significant improvement in product quality and octane number was completely unexpected as well as unpredictable.

EXAMPLE 2

A second catalyst, catalyst B, was prepared by protonating a natural calcium aluminosilicate having micropores of about 4 Angstroms using a dilute solution of ammonia salts. Thereafter, in a subsequent step, nickel metal was added in an amount of about 5% by weight by base exchanging with a weak solution of nickel acetate. The treated product was dried, pelleted, calcined and thereafter broken up into 8/16 mesh particle size and thereafter activated, in situ in a stream of $H_2$ rich gas at a temperature of about 950° F. at the pressure shown for each experimental run.

More specifically catalyst B was prepared from a naturally occurring zeolite of about 4 to 6 Angstrom pore size. One part by weight of the crystalline aluminosilicate or zeolite was base-exchanged for about 2 hours at room temperature with about ten (10) parts by weight of 5% $NH_4$ CL solution. This treatment was repeated three additional times for a total time of the order of about 20 hours with the last treatment being for about 16 hours duration. The residue obtained from this $NH_4CL$ treatment or base-exchange step was thereafter water washed to remove chloride from the residue and then filtered. The filter cake thus obtained was refluxed with about 25 parts (wt.) of 0.5 N nickel acetate solution for about 10 minutes and then filtered. The filtered solids or residue was then again water washed. The residue thus obtained was dried, pelleted, crushed to about 30/60 mesh size particles and then air calcined at a temperature of about 1000° F. for about 16 hours. A sufficient quantity of the calcined catalyst was placed in a reactor and $H_2$ reduced or activated for about 4 hours at a temperature of about 950° F. and a pressure of about 400 p.s.i.g. while maintaining fresh flow of $H_2$ rich gas at about 6 s.c.f./h.

The hydrocarbon feed employed in the examples hereinafter discussed was a blend of $C_6$ hydrocarbons to simulate a composition comprising a $C_6$+ catalytic reformate fraction of 98-100 (R+3) octane number obtained from a $C_6$-250° F. Kuwait naphtha at a reforming pressure of about 200 p.s.i.g. This feed was also used with sufficient pyridine added to provide a feed containing about 150 p.p.m. (wt.) nitrogen.

TABLE 2

| | Charge Stock | Run No., MUP 21 | 19 | 20 | 15 | Interpolation of Runs 13, 15, 16, 17, 18 and 23 |
|---|---|---|---|---|---|---|
| Operating Conditions: | | | | | | |
| Pressure, p.s.i.g | | 200 | 400 | 200 | 400 | 200 |
| Temperature, °F | | 950 | 800 | 800 | 800 | 800 |
| LHSV | | 4.0 | 4.0 | 4.0 | 4.0 | 4.0 |
| Added $H_2$/FF Mol Ratio | | 16.1 | 16.1 | 16.1 | 16.1 | 16.1 |
| P.p.m. (Wt.) N added to Feed | | None | None | None | 150 | 150 |
| Product (R+3) ON's: | | | | | | |
| $C_5$+ Gasoline | 100.1 | 109.1 | 107.8 | 106.4 | 106.8 | 105.2 |
| $C_6$+ Gasoline | 100.1 | 109.1 | 107.8 | 106.4 | 106.8 | 105.2 |
| Product Yields, Percent on Charge: | | | | | | |
| C+5, Vol. Percent | 100.0 | 67.3 | 66.8 | 77.3 | 78.2 | 93.6 |
| C+6, Vol. Percent | 100.0 | 67.3 | 66.6 | 77.3 | 78.2 | 93.5 |
| C−5+Coke, Wt. Percent | 0.0 | 30.2 | 33.0 | 24.6 | 19.1 | 2.5 |
| Net $C_6H_6$ Make, Mole Percent | 50.3 | −1.3 | −9.2 | −5.3 | +3.0 | +8.0 |

NOTE.—The data in Table 2 presented above show that at the tabulated operating conditions selective hydroprocessing over Catalyst B, described above, up-grades the nitrogen free $C_6$ free by an impressive 6-9 octane numbers.

On the other hand, hydroprocessing the simulated feed or catalytic reformate above-described in the presence of 150 p.p.m. (wt.) of added nitrogen and at like operating conditions upgrades the $C_6$ feed by about 3 to 7 octane numbers. However, compared to the normal nitrogen free operation, the improvement in the latter case is accompanied by a marked and unexpected increase in the liquid product yields (of about 11-17% on $C_6$ feed).

A third catalyst, catalyst C, was prepared by following the procedure for the preparation of catalyst B, but the final metallic nickel content of the catalyst was limited to approximately ½ of that in catalyst B.

A sufficient quantity of catalyst C (40 cc.) of roughly ⅛″ average particle-size was charged to a pilot-scale adiabatic reactor. The catalyst was pressure-purged with nitrogen gas, and hydrogen reduced or activated for about 6 hours at a temperature of about 950° F. and at a pressure of about 500 p.s.i.g. while maintaining fresh and recycle flow of hydrogen rich gas at 3 and 12 s.c.f./h., respectively.

Table 3.—Feed stock inspections $C_4$–360 Mid-Continent naphtha

| | |
|---|---|
| Gravity ° API | .7235 |
| Molecular weight | 98 |
| Distillation, ASTM, ° F.: | |
| IBP | 103 |
| Percent vol.: | |
| 5 | 132 |
| 10 | 147 |
| 20 | 170 |
| 30 | 187 |
| 40 | 202 |
| 50 | 217 |
| 60 | 232 |
| 70 | 247 |
| 80 | 267 |
| 90 | 290 |
| E.P. | 340 |
| Recovery percent vol. | 99.0 |
| Loss percent vol. | 0.4 |
| | 0.6 |
| Octane ratings: | |
| Research: | |
| Clear (AGAC 100) | 57.4 |
| Plus 3 cc. | 79.0 |

A depentanized catalytic reformate of about 99.5 (R+3) octane number obtained from commercial platinum-alumina reforming of a Mid-Continent $C_4$–360° F. naphtha defined in the above Table III was continuously and selectively hydroprocessed over the above-identified catalyst C at a pressure of about 500 p.s.i.g.

The products from this hydroprocessing step were blended in yield proportions with the $C_5$ and lighter components from the reformer to produce an overall yield octane correlation.

FIGURES I and II and III presented herewith graphically compare the results of the above pilot plant studies which included a normal 500 p.s.i.g. $Pt/Al_2O_3$ catalytic reforming of a $C_4$–360° F. naphtha feed at $C_5$+ severities of up to 102 (R+3) ON (or the equivalent $C_6$+ severities of up to 104 (R+3) ON) with a two-step upgrading of the same naphtha feed to the same final severity level by the combination of process steps including a 500 p.s.i.g. catalytic reforming of the fresh naphtha to make $C_5$+ reformate of about 99 (R+3) ON followed by a 500 p.s.i.g. selective hydroprocessing step as defined herein. The data presented in FIGURES I, II and III show that at $C_5$+ severity of 102 ($C_6$+ of about 104), the two-step process yields of $C_5$+, $C_6$+ and 10 RVP gasolines are about 2, 3 and 2½% greater than for straight reforming, that is, without the selective hydroprocessing steps, all results presented being expressed as percent by volume of the fresh Mid-Continent $C_4$–360° F. naphtha feed.

EXAMPLE 4

A platinum-alumina catalyst was charged in desired quantities into two down-stream reactors of a three-reactor pilot scale series unit and also into the upper section of the third (upstream) reactor. A quantity of catalyst C above-described was charged into the bottom section of this third reactor. The volumetric ratio of the platinum-alumina catalyst to catalyst C in the third reactor was roughly 60:40. The catalysts in the unit were pressure-purged with nitrogen rich gas and subsequently treated or activated with hydrogen-rich gas in the manner similar to that expressed above.

A commercial grade naphtha $C_4$–360° F. E.P. shown below was continuously processed in contact with the catalysts in the above-defined unit at a pressure of about 500 p.s.i.g. The data obtained were compared to a normal 500 p.s.i.g catalytic reforming of the same naphtha in the same three reactor system using the platinum-alumina catalyst alone to make gasolines in the octane range of that obtained by the two-step process.

A summary of these results is shown graphically in FIGURES IV and V. FIGURE IV presents a cluster of curves representing the gas yields obtained for a reforming operation with and without selective cracking of the reformate product for gasoline production. The cluster of curves shows that for a three reactor system employing the selective conversion catalyst in the third reactor along with the reforming catalyst that there is a substantial increase in $C_3$ hydrocarbons without significantly increasing the yields of $C_1$ and $C_2$ hydrocarbons. FIGURE V, on the other hand, presents a cluster of curves representing the desired yields obtained for a reforming operation with and without selective cracking of the reformate product for gasoline production. The cluster of curves of FIGURE V clearly shows among other things the improvement in $C_6$+ yields for the combination process over that obtained by the normal reforming operation.

EXAMPLE 5

Another catalyst, catalyst D, was prepared and dried in the manner identical with that employed to prepare catalyst C. However, the dried catalyst was subsequently partially chelated by contacting with an EDTA (ethylene-diamine-tetraacetic acid) to eliminate the surface (macropore) dual functional non-selective properties of catalyst C. Analytical data obtained from the catalyst thus treated have shown that the net effect of the chelating treatment is to reduce the nickel content from about 2.5% (of catalyst C) to about 2.0% without significantly effecting the alumina content (15.9% for catalyst D; 16.5% for catalyst C).

A more detailed procedure of preparation of the strictly shape-selective catalyst D with pores of 4 to about 5 Angstroms in diameter is described below.

A naturally occurring zeolite was ground to 0.024 inch average particle size. The ground or particulated zeolite was continuously base-exchanged for a period of about 6 days with about 5% ammonium chloride solution maintained at a temperature of about 180° F., at a rate of about 120 pounds of ammonium chloride solution per 1.0 lb. of the zeolite particles. The resulting $NH_4$ zeolite was water-washed until free of chloride ions and subsequently air-dried at a temperature of about 230° F. The dried $NH_4$ zeolite was reflux-contacted for 10 minutes with 0.5 normal nickel acetate solution, using about 853 cc. of the solution per 100 g. of the ammonium-zeolite. The resulting slurry was filtered and the filter-cake was water-washed, using two one-liter washes to remove excess nickel-acetate. The washed wet cake was air-dried at a temperature of 230° F. The resulting dried $Ni-NH_4$-zeolite was treated for 10 minutes at a temperature of about 180° F., with about 820 g. of chelating solution per 100 g., of the dried $Ni-NH_4$-zeolite. The chelating solution was prepared by adding 11.11 g. of EDTA to 1.11 moles of water and by addition of $NH_4OH$ to adjust to 6.2 the final pH value of the solution. The resulting chelated $Ni-NH_4$-zeolite was air-dried at a temperature of about 230° F., and subsequently air-calcined for about 10 hours at a temperature of 1050° F. The final product, catalyst D, was a chelated Ni-H-zeolite.

The chelated and calcined catalyst D prepared as above described was reduced to about ⅛″ particle size and 40 cc. of this material was charged to a bench-scale isothermal reactor. The catalyst in the reactor was $N_2$-purged and $H_2$-activated, or treated, with $H_2$-rich gas at the conditions described hereinbefore with respect to the preparation of catalyst C.

A depentanized commercial-grade catalytic reformate of about 99.6 (R+3) ON, described hereinbefore was continuously hydrogenatively upgraded by contact with the above-described catalyst D at a pressure of about 500 p.s.i.g. The processing conditions employed were approximately as follows: temperature, 800° F.; LHSV, 1.9; ($H_2$+HC) HC actual total molal recycle ratio, 14; mol percent $H_2$ in the recycle gas, 83.6. At these operating conditions, the (R+3) octane rating of the final raw $C_4$-free liquid product was 103.8, indicating a substantial upgrading of the feed.

Evaluation of the data presented in the tables above shows that considerable variation in selectivity is obtainable depending on the operation conditions and catalyst employed. However, more remarkable is the fact that the crystalline alumino-silicate catalysts hereindiscussed which have selective hydrogenating and cracking activities may also be made to effect partial isomerization and dehydrocyclization thereby contributing significantly to the improvement and quantity of high octane product yields.

The selective conversion conditions which may be effected with the selective aluminosilicate catalyst conversion step of this invention may be varied considerably as evidenced by the results presented in the tables. Accordingly, the operating pressures employed may be substantially at reforming pressure condition or the pressure may be above or below the pressure employed in the reforming step. Therefore, the pressure may be as high as about 2000 p.s.i.g. but is preferably maintained at a pressure selected from within the range of from about 100 to about 750 p.s.i.g. and usually not above about 500 p.s.i.g. The temperatures may also be varied considerably within the range of from about 650° F. to about 1350° F. but are preferably maintained close to reforming temperature and in the range of from about 700° F. to about 1000° F. Liquid hourly space velocities (LHSV) may be in the range of from about 0.5 to about 25, more usually from about 1 to about 10 with the $H_2$+ hydrocarbon to hydrocarbon mole ratio of the recycle gas maintained below about 20 and preferably from about 2 to about 12. It is preferred to operate with the hydrogen available in the reformate product, however, under some conditions of operation it may be necessary or desirable to add additional $H_2$ rich gas. Accordingly, excess hydrogen is desirable to assure saturation of the cracked products. Amounts of nitrogen and/or sulfur employed with the naphtha feed may be varied considerably in the range of from about 0 up to about 500 p.p.m. It is preferred, however, to employ the least possible amount that will provide optimum performance.

Having thus provided a general description of the method and catalyst of this invention and provided specific examples with supporting data thereto, reference is now had to the process flow arrangements of FIGURES VI through IX which provide different processing arrangements for practicing several embodiments of the method of this invention.

FIGURE VI presents diagrammatically a processing arrangement of steps comprising catalytic reforming and selective cracking of the reformate product wherein the selective-conversion catalyst is a part of the catalyst fill in the last reactor of, for example, a three reactor reforming system.

FIGURE VII presents diagrammatically a processing arrangement of steps for effecting catalytic reforming and selective conversion of a portion of the reformate product from which $C_5$— hydrocarbons have been removed.

FIGURE VIII presents diagrammatically a processing arrangement of steps comprising split feed reforming of a $C_5$+ naphtha boiling fraction from which a depentanized reformate product is recovered for upgrading by selective conversion in accordance with this invention.

FIGURE IX presents diagrammatically a processing arrangement comprising a combination of steps involving split-feed reforming of a $C_5$+ naphtha boiling fraction wherein at least the last reactor of the sequence of reforming reactor contains the selective conversion catalyst as a part of the catalyst fill in combination with a platinum type reforming catalyst and the higher boiling portion of the naphtha feed is at least partially reformed.

Referring now to FIGURE VI by way of example, a process flow arrangement is diagrammatically shown comprising a three reactor, ($R_1$, $R_2$ and $R_3$) reforming system, a reformate product separator, a depropanizer tower and a debutanizer tower from which a $C_5$+ reformate product can be recovered. The naphtha boiling range hydrocarbon feed enters the process by conduit 2, is combined with a hydrogen rich recycle gas in conduit 4 and passed by conduit 6 to reforming reactor $R_1$. The naphtha feed may be brought up to reforming temperatures in a suitable heater not shown either before or after admixture with the hydrogen rich recycle gas, so that it has an inlet temperature sufficiently high to provide the endothermic reaction heat required in $R_1$. The combined stream of hydrogen and hydrocarbon flows in series through $R_1$, conduit 8, heater 10, conduit 12, reactor $R_2$, conduit 14, heater 16, conduit 18 to reactor $R_3$. In this arrangement $R_3$ houses a portion of a platinum type reforming catalyst in the upper portion of the reactor and the dual purpose catalyst described above in the lower portion of the reactor. On the other hand, since the reactions involving the selective upgrading catalyst result in a liberation of heat and are exothermic, it is contemplated interspacing the selective catalyst with the reforming catalyst in any reactor in the series of reactors in a manner to take advantage of this heat liberation. Accordingly, in this arrangement, it is contemplated that the catalytic volume of reactor $R_3$ will be the same, smaller or even larger than the volume of catalyst in either reactors $R_1$ or $R_2$ and the volume in reactor $R_2$ may be smaller or larger than reactor $R_1$ so that the volume of catalyst employed in the separate reactor may be the same or considerably different. That is, the volume of catalyst in reactor $R_2$ may be smaller or larger than the volume of catalyst in reactor $R_1$, but less than the volume of platinum reforming catalyst in reactor $R_3$. In reactor $R_3$, the total reformate product moves in contact with the selective upgrading catalyst under conditions to obtain the selective conversion of hydrocarbons described above. The total product effluent of reactor $R_3$ is thereafter passed to a suitable separator vessel 24 by conduit 20 containing heat exchanger 22. In separator 24, a hydrogen rich recycle gas stream is separated from the remaining reformate product and removed by conduit 26 for recycle to conduit 4. A portion of this recycle gas may be withdrawn by conduit 28. The remaining reformate product is removed from separator 24 by conduit 30, passed through heat exchanger 22 and then through conduit 34 to a depropanizer tower 36. In tower 36, $C_3$ and lighter hydrocarbons are separated and removed by conduit 38 from the reformate product. The depropanized effluent is then passed by conduit 40 to a debutanized tower 42. Butane rich gas is recovered from tower 42 by conduit 44 and a $C_5$+ reformate rich in aromatics and branch chained hydrocarbons is recovered by conduit 46. The sensible heat in suitable amounts is recovered from the product stream of $R_3$ and may be utilized to preheat the fresh naphtha feeds to the process by heat exchange in heat exchange 22. In the arrangement of FIGURE VII, a naphtha boiling range hydrocarbon to be reformed enters the process by conduit 50 for passage with recycle gas in conduit 52 to reforming reactor $R_1$ containing a platinum type reforming catalyst. The combined stream of hydrogen and hydrocarbon flows in series through reactor $R_1$, conduit 54, heater 56, conduit 58, reactor $R_2$, conduit 60, heater 62, conduit 64, reactor $R_3$, conduit 66 to separator 68. The reforming conditions of reactors $R_1$, $R_2$ and $R_3$ are maintained under these conditions which maximize dehydrogenation of naphthenes to aromatics, dehydrocyclization of paraffins to cyclic compounds and isomerization to highly branched hydrocarbons. In separator 68 a hydrogen rich gas stream is separated from the remaining product effluent and removed by conduit 70 communicating with conduit 52. A portion of this hydrogen rich gas stream may be removed by conduit 72 for further use as hereinafter discussed. The reformate product remaining in separator 68 is withdrawn by conduit 74 and passed in series flow through depropanizer tower 76, debutanizer tower 78 and a depentanizer tower 80. The depentanized reformate is thereafter passed by conduit 82 through heat exchanger 84 and conduit 86 to reactor 88. A portion of the hydrogen rich gas in conduit is passed by 90 to conduit 86 wherein it is combined with the depentanized reformate product being passed to reactor 88. In the arrangement of FIGURE VII, reactor 88 is provided with the selective upgrading catalyst herein described. The reactor is maintained under the selective conversion condition to accomplish at least selective cracking of straight chain paraffins in the presence of $H_2$ to desired $C_5-$ hydrocarbon products as described above. The product of the selective upgrading step is passed by conduit 92 through heat exchanger 84 to a second separator 94. In separator 94, the products are separated to recover lower boiling constituents boiling from about $C_3$ hydrocarbon up to and including $C_5$ hydrocarbons from higher boiling $C_6$ hydrocarbons of relatively high octane number which products may be passed by conduit 96 to depropanizer 76 or by a suitable conduit to separator 68. The high octane reformate product produced by the method and process of this invention is recovered from separator 94 by conduit 98. It may be preferred to pass the $C_5-$ components from separator 94 to separator 68 so that any hydrogen in this stream can be recovered.

In the arrangement of FIGURE VIII, the processing scheme differs from that of FIGURE VII, in that a split feed reforming operation is employed which offers advantages in the reformate product produced. That is, a naphtha fraction boiling in the range of from about $C_5$ hydrocarbons up to about 400° F., end point is introduced to the process by conduit 100 and passed to a splitter 102. In splitter 102, the naphtha feed is separated into a $C_5-$ 290° F., fraction recovered from the top thereof by conduit 104 and a 290° F.–400° F. fraction recovery from the bottom of the splitter 102 by conduit 116. It is to be understood that the cut point need not necessarily be made at the 290° F. boiling point since this point will depend upon the composition of the feed being processed and the cut point may be as low as about 180° F. In this specific arrangement, the lower boiling fraction in conduit 104 is passed in series flow through a reactor $R_1$, conduit 106, heater 108, conduit 110, reactor $R_2$ and conduit 112 to separator 114. The higher boiling fraction or 290+ fraction in conduit 116 is passed in series flow through reactor $R_3$, conduit 118, heater 120, conduit 122, reactor $R_4$ and conduit 124 to separator 114. In this specific arrangement, the reforming process conditions maintained in reactors $R_1$ and $R_2$ are generally more severe than the conditions maintained in reactors $R_3$ and $R_4$. In addition, it is contemplated maintaining the pressure conditions for reforming the low boiling and high boiling portion of the feed substantially the same or different. That is, the operating pressure maintained in reactors $R_1$ and $R_2$ may be of the order of about 200 p.s.i.g. while that maintained in reactors $R_3$ and $R_4$ may be of the order of about 500 p.s.i.g. On the other hand the reactors may be maintained at substantially any desired pressure below about 1000 p.s.i.g. and of decreasing pressure in the direction of flow to obtain a desired flow. In any event, the reforming conditions in reactors $R_3$ and $R_4$ are generally less severe than those employed in reactors $R_1$ and $R_2$ and may be carried out under conditions of sulfur addition with or without independent or simultaneous nitrogen addition. In this specific arrangement the combined product effluents of the separate reforming steps are passed to a common separator 114 for the recovery of a hydrogen rich gaseous stream from an unstabilized reformate stream comprising $C_3+$ hydrocarbons. The unstabilized reformate comprising $C_3+$ hydrocarbons is passed from separator 114 by conduit 126 for series flow through a depropanizer tower 128, a debutanizer tower 130 and a depentanizer tower 132 diagrammatically shown. A $C_6+$ reformate is recovered from tower 132 and passed by conduit 134 to reactor 136 containing the dual function catalyst hereindescribed. The hydrogen rich gas stream separated from the reformate product effluent in separator 114 is removed therefrom by conduit 140 and separated into three streams comprising conduit 142, 144 and 146 for passing hydrogen rich gas to the inlet of reactors $R_1$, $R_3$ and the selective catalyst containing reactor 136. In reactor 136 the $C_6+$ reformate product fraction is passed in contact with the selective catalyst hereindescribed under conditions to upgrade the reformate product in accordance with this invention. The reformate product thus treated in reactor 136 is passed by conduit 148 to a separator 150. In separator 150 the conditions of operation may be selected to recover $C_3$ and lower boiling materials from the reformate product or the separation point may be selected at a higher boiling point. In any event the separated lighter products are passed by conduit 152 to separator 114 and the higher boiling product is recovered from separator 150 by conduit 154.

In the arrangement of FIGURE IX, a split feed processing scheme is provided which embodies the concept of combining the selective upgrading catalyst in the last reactor of a multiple reactor reforming arrangement with a portion of the reforming catalyst and using this reactor above with its combination of catalysts to process a higher boiling portion of the naphtha feed. In the specific arrangement of FIGURE IX, a naphtha feed in conduit 160 boiling from about $C_5$ hydrocarbons up to about 400° F., is split about its 290° F. boiling point in splitter 162. The lower boiling portion of the naphtha feed is removed from the upper portion thereof by conduit 164 and passed in series through reactor $R_1$, conduit 166, heater 168, conduit 170, reactor $R_2$ and conduit 172 to separator 174. In separator 174 a hydrogen rich gas stream is separated and removed therefrom by conduit 176 for recycle to reactor $R_1$. A portion of this hydrogen rich gas may be withdrawn by conduit 178 for other uses as desired. Another portion of the hydrogen rich gas in conduit 176 is withdrawn by conduit 180 and combined with the high boiling portion of the naphtha feed withdrawn from splitter 162 by conduit. This combined stream of hydrogen rich gas and naphtha boiling from about 290° F. to about 400 is thereafter passed to reactor $R_3$ containing a platinum type reforming catalyst and the selective conversion catalysts herein-described. Furthermore, the liquid reformate product of reactor $R_1$ and $R_2$ from which a hydrogen rich gas stream has been removed is passed in series flow through a depropanizer tower 184, a debutanizer tower 186 and a depentanizer tower 188. The depentanized light reformate thus obtained is passed by conduit 190 to reactor $R_3$ which may be one or more reactors in series or parallel flow arrangement is a multi-purpose reactor wherein reforming of the higher boiling portion of the naphtha feed is accomplished along with the selective conversion of the total reformate product boiling above about $C_5$ hydrocarbons. The product obtained from reactor $R_3$ is passed by conduit 192 to separator 194. In separator 194, conditions are selected to separate a desired reformate product from normally gaseous constituents and this reformate product may or may not contain $C_4$ and $C_5$ constituents. However, irrespective of the separator conditions employed, the low boiling fraction will include hydrogen and hydrocarbons boiling below $C_4$ hydrocarbons and this low boiling fraction is recovered and removed by conduit 196 for passage to a separator 174. The higher boiling portion of the reformate product separated in separator 194 is removed by conduit 198 for further treatment as desired.

The processing schemes of FIGURES VI through IX have been generally discussed without specifying operation conditions including pressure drop between reactors to obtain desired flow without auxiliary equipment such as valves, pumps as well as heat-exchange equipment and known arrangements thereof to maintain desired operating conditions. It is recognized, however, that inclusion of these items is essential to the efficient operation of any one of these processing schemes and their proper inclusion in these processing schemes is believed within the skill of one knowledgeable in the art. Furthermore, as suggested herein, any one of the reactors $R_1$ to $R_4$ or the reactor housing the selective upgrading catalyst may be one or more reactors arranged for sequential or parallel flow of hydrocarbon material therethrough since such arrangements do not measurably affect the basic concepts comprising the invention herein-described. It is also to be understood that the reactors housing the platinum reforming catalyst along with the selective upgrading catalyst may be two or more sequentially connected reactor systems containing multi-layer beds of catalyst of the same or different thickness and arranged for a compensating temperature effect between endothermic and exothermic reaction conditions. On the other hand, it is also contemplated dispersing the selective crystalline alumino-silicate containing catalyst in with the platinum type reforming catalyst as separate discrete particles of catalyst.

It is evident from the specific examples herein-presented that numerous variations may be made thereto without departing from the spirit of this invention. In this connection, for example, the selective conversion catalyst employed in the method and processes of this invention, referred to herein as a dual purpose catalyst because of its hydrogenating activity and cracking activity, may comprise a naturally occurring or synthetically prepared crystalline alumino-silicate cracking component of a restricted pore size no greater than about 5 Angstroms promoted with one or more of the known hydrogenating metal components and particularly these selected from groups VI and VIII of the Periodic Table, such as chromium, molybdenum, nickel, cobalt, platinum, palladium, rhodium, osmium, iridium and the like hydrogenating components.

Having thus provided a general description of the improved method of this invention and set forth specific examples thereof by which one can practice applicants' invention it is recognized that many variations and permutations may be made thereto without departing from the spirit thereof and no undue limitations are to be imposed by reasons of the specific examples except as defined by the claims.

We claim:
1. A process for upgrading a $C_5+$ naphtha hydrocarbon fraction which comprises separating a $C_5+$ naphtha hydrocarbon fraction into a low boiling fraction and a high boiling fraction enriched in polycyclic hydrocarbons, reforming said low boiling fraction under conditions selected to increase the yields of higher octane components, combining the reformate product fraction thus obtained from said low boiling fraction with said high boiling fraction, further reforming said combined fraction, depressurizing the combined reformate product to separate hydrogen rich gas therefrom; separating $C_5$ and lower boiling constituents from said depressured reformate product, passing the reformate product boiling above $C_5$ hydrocarbons with hydrogen in contact with a crystalline aluminosilicate catalyst having characteristics selective for converting n-paraffins under hydrogenating conditions to lower boiling products, recovering an upgraded reformate product from said selective cracking step, and separating saturated $C_5$ and lower boiling constituents from aromatic enriched reformate product.

2. A method for upgrading naphtha boiling hydrocarbons which comprises separately reforming a low boiling portion of a naphtha boiling hydrocarbon under conditions to maximize the yields of relatively high octane aromatic constituents including highly branched hydrocarbon constituents in a reformate product, removing $C_5$ and lower boiling hydrocarbon constituents from the reformate product, separating hydrogen rich gas from $C_5$ and lower boiling constituents, passing hydrogen rich gas with reformate product depleted of $C_5$ and lower boiling constituents with a high boiling naphtha fraction in contact with a catalytic material which is selective for cracking primarily normal paraffins under conditions to produce saturated LPG gaseous products, separating $C_5$ and lower boiling constituents from a product of said selective cracking step having an octane rating substantially above the reformate product octane rating and combining the thus separated $C_5$ and lower boiling constituents with the reformate product prior to said hydrogen rich gas separation step.

3. A method for producing gasoline boiling range hydrocarbons rich in isoparaffins and aromatics which comprises reforming a low boiling petroleum naphtha, separately recovering a hydrogen rich gas stream and a $C_3$ to $C_5$ hydrocarbon fraction from the reformate product, combining the low boiling reformate product separated from $C_5$ hydrocarbons with hydrogen rich gas and a naphtha fraction higher boiling than the low boiling naphtha, passing the combined naphtha hydrocarbon feed in contact with a catalyst having a pore structure which is selective for effecting in pore cracking of n-paraffins to the substantial exclusion of isoparaffins at substantially reforming conditions of temperature and pressure, and recovering an aromatic enriched hydrocarbon product of improved octane rating.

4. The method of claim 3 wherein the catalyst selective for the conversion of n-paraffins to saturated products is confined within one or more separate catalyst beds downstream of said reforming catalyst.

5. The method of claim 3 wherein separated hydrogen rich gas is passed to each of said reforming and selective cracking steps.

References Cited
UNITED STATES PATENTS
2,905,621  9/1959  Bauer et al. _____ 208—79
3,331,768  7/1967  Mason et al. _____ 208—111

DELBERT E. GANTZ, Primary Examiner.

T. H. YOUNG, Assistant Examiner.

U.S. Cl. X.R.

208—79